US007058217B2

(12) United States Patent
Thornber et al.

(10) Patent No.: US 7,058,217 B2
(45) Date of Patent: *Jun. 6, 2006

(54) BROADENED-SPECULAR REFLECTION AND LINEAR SUBSPACES FOR OBJECT RECOGNITION

(75) Inventors: Karvel K. Thornber, Berkeley Heights, NJ (US); David W. Jacobs, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 605 days.

This patent is subject to a terminal disclaimer.

(21) Appl. No.: 09/967,206

(22) Filed: Sep. 28, 2001

(65) Prior Publication Data

US 2003/0063793 A1    Apr. 3, 2003

(51) Int. Cl.
*G06K 9/00*    (2006.01)
(52) U.S. Cl. .................. 382/154; 382/115; 382/118; 382/209
(58) Field of Classification Search ........ 382/115–118, 382/154, 181, 209; 345/426
See application file for complete search history.

(56) References Cited

U.S. PATENT DOCUMENTS 6,639,594 B1 * 10/2003 Zhang et al. ............... 345/426

OTHER PUBLICATIONS

Georghiades et al., From few to many: generative models for recognition under variable pose and illumination, Mar. 28, 2002, Automatic face and gesture recognition, pp. 277-284.*
Boivin et al., Image-Based Rendering of Diffus, Specular and Glossy Surfaces from a Single Image, ACM SIGGRAPH, Aug. 1, 2001, pp. 107-116.*
Brelstaff et al., "Detecting Specular Reflections Using Lambertian Constraints," International Conference on Computer Vision, pp. 297-302, 1988.
Coleman et al., "Obtaining 3-Dimensional Shape of Textured and Specular Surfaces Using Four-Source Photometry," Physics-Based Vision Principles and Practice, Shape Recovery, pp. 180-199, 1992.

Ramamoorthi et al., "On the Relationship Between Radiance and Irradiance: Determining the Illumination From Images of a Convex Lambertian Object," to appear in Journal of the Optical Society of America A.
Cabral et al., "Bidirectional Reflection Functions from Surface Bump Maps," Computer Graphics, vol. 21, No. 4, pp. 273-281, 1987.
Hallinan, "A Low-Dimensional Representation of Human Faces for Arbitrary Lighting Conditions," IEEE Conf. On Computer Vision and Pattern Recognition, pp. 995-999, 1999.
Marschner et al., "Image-Based BRDF Measurement Including Human Skin," In Proceedings of 10th Eurographics Workshop on Rendering, pp. 139-152, 1999.
Yuille et al., "Determining Generative Models of Objects Under Varying Illumination: Shape and Albedo from Multiple Images Using SVD and Integrability," International Journal of Computer Vision, pp. 1-35, 1999.
Ramamoorthi et al., "A Signal-Processing Framework for Inverse Rendering," Computer Graphics Proceedings, Annual Conference Series, pp. 117-128, 2001.
R. Basri, et al., "Lambertian Reflectance and Linear Subspaces" NEC Research Institute, Inc. Technical Report, dated Aug. 16, 2000, pp. 1-33.
R. Basri, et al., "Lambertian Reflectance and Linear Subspaces" NEC Research Institute, Inc. Technical Report, dated Dec. 13, 2000, pp. 1-27.

* cited by examiner

*Primary Examiner*—Bhavesh M. Mehta
*Assistant Examiner*—John B. Strege
(74) *Attorney, Agent, or Firm*—Scully, Scott, Murphy & Presser, P.C.

(57) ABSTRACT

The present invention is a method of deriving a reflectance function that analytically approximates the light reflected from an object model in terms of the spherical harmonic components of light. The reflectance function depends upon the intensity of light incident at each point on the model, the intensity of light diffusely reflected, and the intensity of light broadened-specularly reflected in the direction of an observer. This reflectance function is used in the process of machine vision, by allowing a machine to optimize the reflectance function and arrive at an optimal rendered image of the object model, relative to an input image. Therefore, the recognition of an image produced under variable lighting conditions is more robust. The reflectance function of the present invention also has applicability in other fields, such as computer graphics.

9 Claims, No Drawings

BROADENED-SPECULAR REFLECTION AND LINEAR SUBSPACES FOR OBJECT RECOGNITION

BACKGROUND OF THE INVENTION

1. Field of Invention

The present invention relates generally to machine vision, and more particularly, to a method of modeling the broadened-specular reflection of light to allow a machine to recognize the image of an object illuminated by varying lighting conditions.

2. Description of Related Art

It is clear that changes in lighting can have a large effect on how an object, such as a person, looks. Understanding this is essential to building effective object recognition systems.

U.S. patent application Ser. No. 09/705,507, filed 3 Nov. 2000, entitled "Lambertian Reflectance and Linear Subspaces", now U.S. Pat. No. 6,853,745, the disclosure of which is hereby incorporated by reference, considered the relationship between the function that describes the lighting intensity, and the reflectance function that describes how much light an object reflects as a function of its surface normal, under a given lighting condition. Representing these functions as spherical harmonics, it was shown that for Lambertian reflectance the mapping from lighting to reflectance is a convolution with a nearly perfect low-pass filter. High-frequency components of the lighting hardly affect the reflectance function. Therefore, nearly all Lambertian reflectance functions could be modeled as some linear combination of nine spherical harmonic components.

These low-dimensional approximations have two key advantages. First, they are described with few parameters, thus optimization is simpler. Moreover, the images produced under low-frequency lighting are inherently immune to small changes in orientation. A small rotation in the surface normal is equivalent to a small rotation in the light. However, low-frequency light does not appreciably change with a small rotation. The analysis shows this, in that an image produced by an $n^{th}$ order harmonic light component is computed by taking an $n^{th}$ degree polynomial of the components of the surface normal.

While promising, these results considered only Lambertian reflectance. Specular reflectance can significantly affect how an object appears. For example, a human face may have some oiliness, particularly on the forehead, which reflects light specularly. This is seen as highlights on the object.

Specular reflectance cannot be approximated well by only considering low-dimensional linear subspaces which capture only low-frequency lighting. Intuitively, the set of possible reflectance functions for a perfect mirror is the same as the set of possible lighting functions, as will be shown, infra. The question remains how to cope with specularity in object recognition using models that will inevitably be imperfect.

Specularities are often thought of as mainly present in spatially localized highlights, which occur when a bright light source is reflected by a shiny object. Such highlights can potentially be identified in the image and processed separately. For example, the algorithms described in Coleman, et al., *Obtaining 3-Dimensional Shape of Textured and Specular Surfaces Using Four-Source Photometry, Physics-Based Vision Principles and Practice, Shape Recovery*, pp. 180–199 (1992), and Brelstaff, et al., *Detecting Specular Reflection Using Lambertian Constraints, International Conference on Computer Vision*, pp. 297–302 (1988), treat specular pixels as statistical outliers that should be discarded. However, specularities due to low-frequency lighting can be spread out throughout the entire image. Since these specularities affect every pixel in the image, their effect must be better understood; they cannot simply be discarded.

Some previous works have considered specular effects also as convolutions. Basri, et al., (August 2000) considered a version of the Phong model in which the specular lobe is a rotationally symmetric shape centered about a peak that is a 180-degree rotation of the direction of the incoming light about the surface normal. In such a model, specular reflection doubles the frequency of the incoming light, and then acts as a convolution. However, this model is heuristic, and not physically based. It does not extend to realistic models.

Ramamoorthi, et al., *On the Relationship between Radiance and Irradiance: Determining the Illumination From Images of a Convex Lambertian Object*, to appear in *Journal of the Optical Society of America A*, considered the effects of arbitrary bi-directional reflectance distribution functions (BRDFs) on the light field. They were able to develop algorithms for recovering the BRDF and/or the lighting given a measured light field and an object with a known 3D structure. Though interesting, these results are not generally applicable to machine vision because, without special sensing devices, the light field is not available. An image of an object is produced by the reflectance function that describes how the surface normals reflect light in one fixed direction. Therefore, an image corresponds to a 2D slice through the light field. For an arbitrary BRDF, the 2D reflectance function for a fixed viewpoint no longer results from a convolution of the lighting.

BRIEF SUMMARY OF THE INVENTION

The goal of the present invention is to allow a machine, such as a computer, to match an input image of an object, such as a human face, to an object model stored in a database associated with the machine, and to perform this matching with a high degree of accuracy.

The steps of the recognition method of the present invention include providing a database of three-dimensional object models, providing an input image, positioning each three dimensional model relative to the input image, determining an optimal rendered image of the model that is most similar to the input image, computing a measure of similarity between the input image and the optimal rendered image of each model, and selecting the object whose optimal rendered image is most similar to the input image. The step of determining an optimal rendered image includes deriving a reflectance function for each object that includes the effects of both broadened-specular and diffuse reflection, and optimizing that reflectance function to most closely match the input image.

The method of the present invention includes rendering the images produced by an object model when illuminated only by each of a plurality of spherical harmonic components of light. The summation of these components defines the reflectance function for the object model. The derived reflectance function takes into account the intensity of light components incident on the object model, the intensity of light diffusely reflected from the model, and the intensity of light specularly reflected from the model, the last component being dependent on the angle between the direction of the observer and the direction of specular reflection.

To overcome the limitations of dealing with specular reflection, a two-pronged strategy is used. The light in low-frequency and higher-frequency components are analyzed separately. The low-frequency components are analyzed using the method of the present invention, and the results of this analysis are evaluated to determine if they are sufficient to match an optimal rendered image of the object model to the input image.

DETAILED DESCRIPTION OF THE INVENTION

Although detailed and/or microscopic models of reflection exist, these apply principally to homogeneous, rigid, material surfaces. For reflection from inhomogeneous, flexible surfaces such as faces, where most of the features of interest are configurational, a more robust model that captures the most important aspects of the scattered light is more appropriate. Thus the Lambertian model, which simply scatters incident radiation equally into the hemisphere above each surface element, is usually chosen.

However, due to broadened-specular reflection, in viewing a person's face, regions of unusually high reflectivity are apparent. The intensity of light reflect from these regions is sensitive to the viewing direction. As this aspect of the illuminated face cannot be captured by Lambertian scattering, even in principle, the Lambertian model is supplemented with the Phong model. The latter scatters the incoming light preferentially into directions distributed about the direction of purely specular reflection. In addition, the distribution of scattered directions is readily analyzable in the spherical-harmonic representation, in a manner similar to that of the Lambertian model. Appropriately weighted, this additional and more selective scattering should adequately model the human face for most lighting conditions of interest.

Though an enhancement of the Phong model of reflection was chosen, the method of the present invention need not be based upon the Phong model. Any model that depends only on the cosine of the angle between the reflected light and the direction of perfect specular reflection can be treated in the same manner.

While not completely dominant, low-frequency lighting will have a considerable effect on the reflectances due to the broadened-specular component of an object. This is because many situations contain significant low-frequency lighting, such as outdoors on a cloudy day, and many indoor settings.

The method of the present invention shows how to analyze the reflectance function that is produced by specular reflection for more physically realistic BRDFs. This is accomplished by adding more realistic terms to the Phong model. These terms modulate the Phong model by the amount of light that is actually striking a surface patch. The new model allows the development of techniques that will be relevant for more physically realistic models, while avoiding some of the complexity of those models.

The physically realistic model leads to the problem of taking integrals in three terms: the lighting intensity, which is a function of its incoming direction; the specular term, which is a function of the angle between the specular peak and the viewing direction; and the amount of light striking the surface, which is a function of the angle between the incoming light and the surface normal. After expanding these terms in spherical harmonics, this can be rewritten as the integral of the product of three harmonics. This problem has been solved in other areas of research, for example atomic spectroscopy. The solution may be thought of as a generalization of the convolution theorem to this case.

The results can be used to determine the set of images that an object produces when lighting consists of a single harmonic component. Therefore, one can analytically characterize the images an object produces, and determine how the effect of low- and high-frequency lighting on an image varies with the parameters of the Phong model.

Conceptually, the method of deriving the reflectance function of an object model according present invention involves transforming the function of light intensity incident upon an object into its low-dimensional spherical harmonic components. In the present sense, low-dimensional is used to mean the 9D subspace formed by the summation of the $0^{th}$, $1^{st}$, and $2^{nd}$ order spherical harmonic components. Each component is applied to the surface normal at each point on the object. Using the reflectance model described herein, the reflectance function is determined, and described in terms of the same spherical harmonic components. These harmonic components can then be summed to produce a rendered image, a linear representation of the image of the object model. As a practical matter, however, the machine can utilize the harmonic components and optimize their weightings to determine if the image received is a match to some known object in its database.

The technique of analyzing the reflectance function in terms of spherical harmonic components follows.

Given $L(\hat{n}_i)$, the intensity of light incident in the $-\hat{n}_i$ if direction on a perfectly reflecting, smooth surface with outward pointing normal $\hat{n}$, the reflected light $r_S(\hat{n}_e,\hat{n})$ in direction $\hat{n}_e$ can be expressed as $$r_S(\hat{n}_e,\hat{n}) = u(\hat{n}_e \cdot \hat{n}) \int d\hat{n}_i L(\hat{n}_i) \delta(\hat{n}_e - \hat{n}_r)$$

where $\hat{n}_r = 2\hat{n}(\hat{n}_i \cdot \hat{n}) - \hat{n}_i$ is the direction of specular reflection corresponding to incoming light along $-\hat{n}_i$. (Note $\hat{n}_r$ lies in the $(\hat{n},\hat{n}_i)$ plane, $\hat{n}_r \cdot \hat{n}_r = 1$, and $\hat{n} \cdot \hat{n}_r = \hat{n} \cdot \hat{n}_i$. Here u(x) is the unit step function: u(x)=0,x<0,u(x)=1,x>0.) The prefactor $u(\hat{n}_e \cdot \hat{n})$ ensures that the orientation $\hat{n}$ of the surface permits the reflection of light in direction $\hat{n}_e$. As $(\hat{n}_e - \hat{n}_r) = R(\hat{n}'_e - \hat{n}_i)$, where $\hat{n}'_e = 2\hat{n}(\hat{n}_e \cdot \hat{n}) - \hat{n}_e$ and R is a rotation of $\pi$ about $\hat{n}$, $\delta(\hat{n}_e - \hat{n}_r) = \delta(\hat{n}'_e - \hat{n}_i)$, and since $$\delta(\hat{n}_1 - \hat{n}_2) = \sum_{lm} Y_{lm}(\hat{n}_1) Y^*_{lm}(\hat{n}_2),$$

where $Y_{lm}(\hat{n})$ is the lm spherical harmonic evaluated in direction $\hat{n}$, $r_S(\hat{n}_e,\hat{n})$ can be expressed compactly as $$r_s(\hat{n}_e, \hat{n}) = u(\hat{n}_e \cdot \hat{n}) \sum_{lm} L_{lm} Y_{lm}(2\hat{n}(\hat{n}_e \cdot \hat{n}) - \hat{n}_e),$$

where the $L_{lm} = \int d\hat{n}_i L(\hat{n}_i) Y^*_{lm}(\hat{n}_i)$ are the components (strengths) of the incident intensity expressed in spherical harmonics. Choosing $\hat{n}_e$ to be the $\hat{z}$ axis, and noting that $\hat{n}'_e = R\hat{n}_e$ is now simply the rotation of the $\hat{z}$ axis about $\hat{n}$ by $\pi$, $Y_{lm}(R\hat{z})$ becomes $Y_{lm}(\beta,\alpha)$, where $\alpha$ and $\beta$ are the first two Euler angles of R. This is discussed in more detail below in connection with the Phong model. Note especially that as the polar angle of the surface normal $\hat{n}$ varies from 0 to $\pi/2$, the polar angle $\beta$ varies from 0 to $\pi$, as expected for perfect reflection.

For comparison, one can derive the reflected light from a Lambertian surface $r_L(\hat{n}_e,\hat{n})$ in a similar manner.

$$r_L(\hat{n}_e,\hat{n}) = u(\hat{n}_e \cdot \hat{n}) \int d\hat{n}_i L(\hat{n}_i)(\hat{n} \cdot \hat{n}_i \vee 0)$$

where $(A \vee B) = \max(A, B)$. A Lambertian surface scatters the incident light equally in all directions $\hat{n}_e$ such that $(\hat{n}_e \cdot \hat{n}) > 0$. The $(\hat{n} \cdot \hat{n}_i)$ factor weights the incident flux density in the $-\hat{n}_i$ direction. Since $$L(\hat{n}_i) = \sum_{lm} L_{lm} Y_{lm}(\hat{n}_i)$$

and $$(\hat{n} \cdot \hat{n}_i \vee 0) = \sum_{lm} (4\pi/(2l+1))^{1/2} k_l Y^*_{lm}(\hat{n}_i) Y_{lm}(\hat{n})$$

one can obtain the Basri-Jacobs(B-J) Expression:

$$r_L(\hat{n}_e, \hat{n}) = u(\hat{n}_e \cdot \hat{n}) \sum_{lm} (L_{lm}(4\pi/(2l+1)))^{1/2} k_l Y_{lm}(\hat{n})$$

The $k_l$ coefficients calculated by B-J fall off as $l^{-2}$, and vanish for $l \geq 3$, if $l$ is odd. This, coupled with constraints on the size of the $L_{lm}$ (as $L(\hat{n}_i) \geq 0$) enabled them to truncate the sum over $l$ at $l=2$.

Such a truncation is clearly not possible for specular reflection; however, apart from mirrors, such reflection is seldom present. One model which retains much of the directionality of specular reflection, but introduces a controlled amount of lateral diffusion is the Phong Model, in terms of which one can write $$r_p(\hat{n}_e, \hat{n}) = u(\hat{n}_e \cdot \hat{n}) \int d\hat{n}_i L(\hat{n}_i)(\hat{n} \cdot \hat{n}_i \vee 0)(\hat{n}_e \cdot \hat{n}_r \vee 0)^p$$

where as above $\hat{n}_r = 2\hat{n}(\hat{n}_i \cdot \hat{n}) - \hat{n}_i$. Here the last term distributes the incident light into cones of decreasing intensity about the nominal direction of (specular) reflection $\hat{n}_r$: the larger the exponent $p$, the sharper the distribution. This expression reduces to $r_L$ in the limit that $p \to 0$. As such it may overemphasize the diffuseness of the scattering. Also, Phong scattering is intended to augment rather than replace Lambertian scattering. An expression that reduces to $r_S$ in the limit $p \to \infty$ is:

$$r'_p(\hat{n}_e, \hat{n}) = u(\hat{n}_e \cdot \hat{n}) \int d\hat{n}_i L(\hat{n}_i) u(\hat{n} \cdot \hat{n}_i)(\hat{n}_e \cdot \hat{n}_r \vee 0)^p$$

which may overemphasize the specularity of the scattering. Fortunately the analysis is valid for both: one need only substitute a $k_l^{(0)}$ for $k_l$ to obtain $r'_p$ from $r_p$.

In the above manner one can write $$L(\hat{n}_i) = \sum_{lm} L_{lm} Y_{lm}(\hat{n}_i)$$

$$(\hat{n} \cdot \hat{n}_i \vee 0) = \sum_{l_1 m_1} (4\pi/(2l_1+1))^{1/2} k_{l_1} Y_{l_1 m_1}(\hat{n}) Y^*_{l_1 m_1}(\hat{n}_i)$$

$$u(\hat{n} \cdot \hat{n}_i) = \sum_{l_1 m_1} (4\pi/(2l_1+1))^{1/2} k_{l_1}^{(0)} Y_{l_1 m_1}(\hat{n}) Y^*_{l_1 m_1}(\hat{n}_i)$$

$$(\hat{n}_e \cdot \hat{n}_r \vee 0)^p = \sum_{l_2 m_2} (4\pi/(2l_2+1))^{1/2} k_{l_2}^{(p)} Y_{l_2 m_2}(\hat{n}_e) Y^*_{l_2 m_2}(\hat{n}_r)$$

where $k_l$ is calculated in B-J Appendix A, and $k_l^{(p)}$ in B-J Appendix C, where $\alpha$ is used in place of $p$. $k_l^{(0)}$ can be obtained analogously, and is given below, along with $k_l$; $k_l^{(p)}$ is given below as well. Combining one can obtain $$r_p(\hat{n}_e, \hat{n}) = u(\hat{n}_e \cdot \hat{n}) \sum_{lm} L_{lm} \cdot \sum_{l_1 m_1} (4\pi/(2l_1+1))^{1/2} k_{l_1} Y_{l_1 m_1}(\hat{n}) \cdot \sum_{l_2 m_2} (4\pi/(2l_2+1))^{1/2}$$

$$k_{l_2}^{(p)} Y_{l_2 m_2}(\hat{n}_e) \cdot \int d\hat{n}_i Y_{lm}(\hat{n}_i) Y^*_{l_1 m_1}(\hat{n}_i) Y^*_{l_2 m_2}(\hat{n}_r)$$

where the remaining integral over incident direction $(\hat{n}_i)$ is independent of $(\hat{n}_e)$. For the purposes of the above $$k_l = \begin{cases} \pi^{1/2}/2 & l = 0 \\ (\pi/3)^{1/2} & l = 1 \\ \dfrac{(-1)^{1+l/2}((2l+1)\pi)^{1/2}(l-2)!}{2^l(l/2-1)!(l/2+1)!} & l \geq 2, \text{ even} \\ 0 & l \geq 2, \text{ odd} \end{cases}$$

$$k_l^{(0)} = \begin{cases} \pi^{1/2} & l = 0 \\ \dfrac{(-1)^{(1+l)/2}((2l+1)\pi)^{1/2}(l-1)!}{2^l((l-1)/2)!((l+1)/2)!} & l > 0, \text{ odd} \\ 0 & l > 0, \text{ even} \end{cases}$$

and $$k_l^{(p)} = \begin{cases} 0 & p < l, (l-p) \text{ even} \\ \dfrac{((2l+1)\pi)^{1/2}(-1)^{(l+p+1)/2} p!(l-p-1)!}{2^l((l-p-1)/2)!((l+p+1)/2)!} & p < l, (l-p) \text{ odd} \\ \dfrac{((2p+1)\pi)^{1/2} 2^{p-1} p!(p-1)!}{(2p+1)(2p-1)!} & p = l \\ \dfrac{((2l+1)\pi)^{1/2} 2^{l+1} p!((p+l)/2)!}{(p-l)(p+l+1)!((p-l)/2-1)!} & p > l, (p-l) \text{ even} \\ \dfrac{((2l+1)\pi)^{1/2} p!((p-l-1)/2)!}{2^{l+1}(p-l)!((p+l+1)/2)!} & p > l, (p-l) \text{ odd} \end{cases}$$

Without loss of generality one can take the direction of observation $-\hat{n}_e$ to be the $-\hat{z}$ axis of our coordinate system, as is commonly chosen. This is also the system in which the lighting is specified. As $Y_{lm}(\hat{z})$ is zero unless $m=0$, $Y_{l0}(\hat{n}_r)$ must be expressed in terms of $Y_{lm}(\hat{n}_i)$ in order to carry out the final integral over $\hat{n}_i$.

Proceeding as follows: $\hat{n}_r = 2\hat{n}(\hat{n}_i \cdot \hat{n}) - \hat{n}_i = R\hat{n}_i$ represents a rotation $R$ of $\hat{n}_i$ around by $\hat{n}$ by $\pi$ (or by $-\pi$). Though it may intuitively seem more natural to view the relation between $\hat{n}_i$ and $\hat{n}_r$ as a rotation in the plane of incidence defined by $\hat{n}_i$ and $\hat{n}$ about an axis through $\hat{n}_i \times \hat{n}$, using $R$ instead effects numerous simplifications. From the relation between $\hat{n}_r$ and $\hat{n}_i$ it is clear that $$R = 2\hat{n}\hat{n}^T - I$$

whose representation in terms of Euler angles can be found by first equating $R_{33}$ entries $$\cos \beta = R_{33} = 2n_z^2 - 1, \sin \beta = 2|n_z|(1-n_z^2)^{1/2}$$

and then equating $R_{31}$ entries $$R_{31} = 2n_z n_x = \sin \beta \cos \alpha; \cos \alpha = n_z n_x/|n_z|(n_x^2 + n_y^2)^{1/2}$$

Since $R$ is symmetric, $\cos \gamma = -\cos \alpha$ and $\sin \gamma = \sin \alpha$. Thus $\gamma = (\pi - \alpha)$. Also, $\sin \alpha = n_z n_y/|n_z|(n_x^2 + n_y^2)^{1/2}$. (Here $(\alpha, \beta, \gamma)$ are the three Euler angles representing $R$, and $\hat{n} = (n_x, n_y, n_z)$. Strictly speaking, the Euler angles refer to a rotation of the coordinates axes while the vectors remain fixed. Hence, one should be concerned with representing $R^T$; however, since R is symmetric, $R=R^T$.) Since $\hat{z}\cdot\hat{n}>0, n_z>0$, and $n_z/|n_z|=1$.

Now, to evaluate $Y_{l0}(R\hat{n}_i)$, the polar angle $\theta_r$ between $\hat{n}_i$ and the rotated $\hat{z}$-axis is needed. However, in the original system, the rotated $\hat{z}$-axis lies in the $\hat{n}_{\beta\alpha}=(\theta=\beta,\phi=\alpha)$ direction, and $\hat{n}_i$ is unchanged. Hence $\cos\theta_r=\hat{n}_i\cdot\hat{n}_{\beta\alpha}$ and, as can be shown $$Y_{l0}(\hat{n}_r) = Y_{l0}(R\hat{n}_i) = (4\pi/(2l+1))^{1/2} \sum_m Y^*_{lm}(\beta,\alpha) Y_{lm}(\hat{n}_i)$$

The expression for the reflected light based upon the Phong model then becomes $$r_P(\hat{z},\hat{n}) = u(\hat{z}\cdot\hat{n}) \sum_{lm} L_{lm} \cdot \sum_{l_1 m_1} (4\pi/(2l_1+1))^{1/2} k_{l_1} Y_{l_1 m_1}(\hat{n}) \cdot \sum_{l_2 m_2} (4\pi/(2l_2+1))^{1/2} k_{l_2}^{(p)} Y_{l_2 m_2}(\beta,\alpha) \cdot \int d\hat{n}_i Y_{lm}(\hat{n}_i) Y^*_{l_1 m_1}(\hat{n}_i) Y^*_{l_2 m_2}(\hat{n}_i)$$

It remains to evaluate the latter integral.

The latter integral can be readily performed if the product of the second pair of spherical harmonics can be written as a sum of spherical harmonics. Such problems were solved in the context of the theory of angular momentum, a key component of present understanding of atomic spectroscopy. The result for this integral is that it is equal to $$((2l_1+1)(2l_2+1)/4\pi(2l+1))^{1/2} C(l_1 l_2 l; m_1 m_2 m) C(l_1 l_2 l; 000)$$

where the C are Clebsch-Gordon (C-G) coefficients; simple, real numbers, readily calculable, and equal to zero unless $m=m_1+m_2, |m_1|\leq l_1, |m_2|\leq l_2, |m|\leq l$, and l equals one of $(l_1+l_2), (l_1+l_2-1), \ldots, |l_1-l_2|$. This is known from previous work in angular momentum theory.

The next step is to consider, based on the values of $k_{l_1}$ and $k_{l_2}^{(p)}$, which values of the C-G coefficients will be necessary in evaluating the sums over $(l_1, m_1, l_2, m_2)$. Again, from work in angular momentum theory, the following is an expression for the C-G coefficients:

$$C(l_1 l_2 l; m_1 m_2 m) = \delta_{m, m_1+m_2} \cdot$$
$$\left((2l+1) \frac{(l+l_1-l_2)!(l-l_1+l_2)!(l_1+l_2-l)!(l+m)!(l-m)!}{(l_1+l_2+l+1)!(l_1-m_1)!(l_1+m_1)!(l_2-m_2)!(l_2+m_2)!}\right)^{1/2} \cdot$$
$$\sum_q (-1)^{q+l_2+m_2} \frac{(l_2+l+m_1-q)!(l_1-m_1+q)!}{q!(l-l_1+l_2-q)!(l+m-q)!(q+l_1-l_2-m)!}$$

where q are the integers satisfying $$0 \vee (l_2-l_1+m) \leq q \leq (l+m) \vee (l_2-l_1+l)$$

where $A \vee B = \max(A,B)$ and $C \vee D = \min(C,D)$. As usual, the convention is that $0!=1$. Other useful facts about C-G coefficients are that $C(l_1 0 l; m_1 0 m) = \delta_{l_1 l} \delta_{m_1 m}$, and that $C(l_1 l_2 l; 000)=0$ unless $(l_1+l_2+l)$ is even.

Consider the $l=0$, $m=0$ factor (of $L_{00}$) in $r_p(\hat{z},\hat{n})$, the d.c. response, so to speak. Since $l=0$, $l_1=l_2$, and as $m=0$, $m_2=-m_1=\bar{m}_1$ one can either evaluate $$C(l_1 l_2 0; m_1 m_2 0) = \delta_{l_1 l_2} \delta_{m_1 \bar{m}_2} (-1)^{l_1-m_1}/(2l_1+1)^{1/2}$$

or perform the above integration over incident-light directions $$\int d\hat{n}_i Y_{00}(\hat{n}_i) Y^*_{l_1 m_1}(\hat{n}_i) Y_{l_2 m_2}(\hat{n}_i) = (-1)^{m_1}(4\pi)^{-1/2} \delta_{l_1 l_2} \delta_{m_1 \bar{m}_2}$$

to obtain for $l=0, m=0$:

$$r_P(\hat{z},\hat{n})_{00} = u(\hat{z}\cdot\hat{n}) L_{00} (4\pi)^{1/2} \sum_{l_1=0} k_{l_1} k_{l_1}^{(p)} (2l_1+1)^{-1} \sum_{m_1=-l_1}^{l_1} Y_{l_1 m_1}(\hat{n}) Y^*_{l_1 m_1}(\beta,\alpha)$$

Thus, unlike the cases of Lambertian and specular reflection, even for uniform lighting conditions, the reflected light is a function of the surface normal $\hat{n}$. This is in addition to the effect of the nonlinearity due to the $u(\hat{z}\cdot\hat{n})$ term, which enters in all cases. Do note, however, that $k_{l_1}$ decreases as $1/l_1^2$, while $k_{l_1}^{(p)}$ changes comparatively slowly until $$l_1 > p^{\frac{1}{2}},$$

where upon it falls roughly as $\exp{-l_1^2/p}$ reaching $2^{-p}$ by $l_1=p$, and then falls off as $1/l_1^{1+p}$ for $l_1>p$. Thus, the major $\hat{n}$-dependent term in the $(l=0, m=0)$-component of $r_P$ will be the $l_1=1$ term in the above sum. (The sum over $m_1$ is, of course, real.) For the case of $r'_P, k_{l_1}^{(o)}$ falls off as $1/l_1$.

One might wonder how, if the lumination is uniform in solid angle ($L_{lm}=0, l>0$), one could possibly have an angular dependence in the reflected light. However, any scattering which depends on, and only on, the angle to the surface normal will exhibit a non-uniform distribution when viewed from different directions. For example, if light were scattered only in the direction of the surface normal, regardless of incident angle, then a sphere would appear dark except for an intense bright emission from the center of the apparent disk. This is easily seen analytically. Choosing $\hat{n}_e=\hat{z}$, the expressions for $r_S, r_L, r_P$ have the generic from $$r(\hat{n}) = \int d\hat{n}_i L(\hat{n}) g(\hat{n}_i, \hat{n}) = \sum_{lm} L_{lm} G_{lm}(\hat{n}) g(\hat{n}_i, \hat{n}) = \sum_{lm} G_{lm}(\hat{n}) Y^*_{lm}(\hat{n}_i)$$

Thus $G_{00} = \int d\hat{n}_i g(\hat{n}_i, \hat{n})/(4\pi)^{1/2}$ and since $g_P$ depends on $(\hat{n}_i \cdot \hat{n}), (\hat{n}_e \cdot \hat{n}_i),$ and $(\hat{n}_e \cdot \hat{n})$, the integral over $\hat{n}_i, (4\pi)^{1/2} G_{00}$, will be a function of $(\hat{n} \cdot \hat{n}_e) = (\hat{n} \cdot \hat{z})$. Hence, although $G_{00}$ is independent of the azimuthal orientation of $\hat{n}$, in most cases it will depend on $\hat{n}$'s polar orientation. Since $g_L$ depends only on $(\hat{n}_i \cdot \hat{n})$, $G_{00}$ for the Lambertian model is independent of $\hat{n}$; the tight coupling between the incident and reflected light in specular reflection yields $G_{00} = Y_{00}(\hat{n}'_e) = (4\pi)^{-1/2}$ a constant. However, for most $g(\hat{n}_i, \hat{n}), G_{00} = G_{00}(\hat{n} \cdot \hat{z})$. Without the $(\hat{n}_i \cdot \hat{n})$ constraint, this directional dependence can be suppressed; however, scattering from very oblique surfaces can be enhanced as much as a factor of 2.

See also the coefficients of $L_{1m}$ and $L_{2m}$ in the expression for $r_p(\hat{z},\hat{n})$. For $l=1$, the only possible values of $(l_1, l_2)$ are $l_1=(l_2+1)$ and $l_2=(l_1+1), (l_1 \vee l_2)$ starting from zero: $l_1=l_2$ is out as $l_1+l_2+l=2l_1+l$, which, being odd, renders $C(l_1 l_1 l; 000)=0$; and $l_1=l_2+n$ or $l_2=l_1+n$ yields a smallest l of n, hence $n \geq 2$ are out for $l=1$. Also, as $$C(l_1 l_2 l; m_1 m_2 m) = (-1)^{l_1+l_2-l} C(l_2 l_1 l; m_1 m_2 m)$$

(exchange), one can easily obtain the $l_1=(l_2+1)$ case. Using Rose's expression, find:

$$C(l_1(l_1+l)1; m_1(m-m_1)m = $$
$$(-1)^{l_1-m_1}\left(\frac{6(2l_1)!(1+m+l_1-m_1)!(1-m+l_1+m_1)!}{(2l_1+3)!(l_1-m_1)!(l_1+m_1)!(1+m)!(1-m)!}\right)^{1/2}$$

in which, $-l_1 \le m_1 \le l_1$ and $-1 \le m \le 1$. Using this, one can obtain for the $(l=1, m)$ term in the Phong-model reflectance:

$$r_P(\hat{z},\hat{n})_{1m} = u(\hat{z}\cdot\hat{n})L_{1m}(-1)^m(4\pi/3)^{1/2}$$
$$\sum_{l_1}\frac{6(l_1+1)}{(2l_1+3)(2l_1+2)(2l_1+1)} \cdot \sum_{m_1}\left(k_{l_1}k_{l_1+1}^{(p)}Y_{l_1m_1}(\hat{n})Y^*_{l_1+1m_1-m}(\beta,\alpha) + \right.$$
$$k_{l_1+1}k_{l_1}^{(p)}Y^*_{l_1+1m_1-m}(\hat{n})Y_{l_1m_1}(\beta,\alpha)\bigg) \cdot$$
$$\left(\frac{(1+m+l_1-m_1)!(1-m+l_1+m_1)!}{(l_1-m_1)!(l_1+m_1)!(1+m)!(1-m)!}\right)^{1/2}$$

In this $(l=1)$ expression, the sum on $l_1$ runs from $l_1=0$, and the sum on $m_1$ runs from $m_1=-l_1$ to $m_1=+l_1$. As with $l=0$, the terms in the $l_1$ sum fall off as $1/l_1^{3+p}$ for $l_1>p$.

For $l=2$, the Clebsch-Gordon coefficients are more complicated. We will simply state the result for this component of the reflectance. Note that only $l_2=l_1+2$, $l_1=l_2+2$, and $l_1=l_2$ must be considered, and that the first two are, of course, closely related. The third case is more involved and requires separate expressions for $m=\pm 2$, $m=\pm 1$, and $m=0$.

$$r_P(\hat{z},\hat{n})_{2m} = u(\hat{z}\cdot\hat{n})L_{2m}(-1)^m(4\pi/5)^{1/2}$$
$$\left(\sum_{l_1}\frac{60(2l_1)!(l_1+2)!}{(2l_1+5)!l_1!}\cdot\sum_{m_1}\left(k_{l_1}k_{l_1+2}^{(p)}Y_{l_1m_1}(\hat{n})Y^*_{l_1+2m_1-m}(\beta,\alpha) + \right.\right.$$
$$k_{l_1+2}k_{l_1}^{(p)}Y^*_{l_1+2m_1-m}(\hat{n})Y_{l_1m_1}(\beta,\alpha)\bigg) \cdot$$
$$\left(\frac{(2+m+l_1-m_1)!(2-m+l_1+m_1)!}{(2+m)!(2-m)!(l_1+m_1)!(l_1-m_1)!}\right)^{1/2} +$$
$$\sum'_{l_1} k_{l_1}k_{l_1}^{(p)}\frac{30(2l_1-2)!}{(2l_1+3)!}(((l_1-1)l_1(l_1+1)(l_1+2)))^{1/2} \cdot$$
$$\sum''_{m_1}((l_1+m_1)(l_1+m_1-1)(l_1-m_1+2)(l_1-m_1+1))^{1/2} \cdot$$
$$\left(\delta_{m,2}Y_{l_1m_1}(\hat{n})Y^*_{l_1m_1-2}(\beta,\alpha) + \delta_{m,-2}Y^*_{l_1m_1}(\hat{n})Y_{l_1m_1-2}(\beta,\alpha)\right) +$$
$$(l_1(l_1+1))^{1/2}\sum'_{m_1}((l_1+m_1)(l_1-m_1+1))^{1/2}(1-2m_1)\cdot$$
$$\left(\delta_{m,1}Y_{l_1m_1}(\hat{n})Y^*_{l_1m_1-1}(\beta,\alpha) + \delta_{m,-1}Y^*_{l_1m_1}(\hat{n})Y_{l_1m_1-1}(\beta,\alpha)\right) +$$
$$\left.\frac{2}{3}l_1(l_1+1)\sum_{m_1}(l_1(l_1+1)-3m_1^2)\delta_{m,0}Y_{l_1m_1}(\hat{n})Y_{l_1m_1-1}(\beta,\alpha)\right)^{1/2}$$

In this $(l=2)$ expression, the terms in the first $(l_2=l_1+2)$, second $(l_2=l_1, m=2)$, and fourth $(l_2=l_1, m=0)$ $l_1$-summations all fall off as $1/l_1^{3+p}$, as for $l=0,1$, while those in the third $(l_2=l_1, m=1)$ fall off as $1/l_1^{5+p}$. The unprimed sum on $l_1$ is over $l_1=0$, and the primed sum is over $l_1=1$. The unprimed sums over $m_1$ are from $-l_1 \le m_1 \le l_1$, the single primed sum is from $-l_1+1 \le m_1 \le l_1$, and the doubled prime sum is from $-l_1+2 \le m_1 \le l_1$. The expression $$C(l_1l_2l; m_1m_2\overline{m}) = (-1)^{l_1+l_2-l}C(l_1l_2l;\overline{m_1m_2}m)$$

was useful in the above derivation.

From the foregoing, the function of broadened specular reflectance, $r_P(\hat{z},\hat{n})$, can be described in terms of a summation of the spherical harmonic components of the light incident upon the model.

It is useful to consider the spherical harmonic components of the reflected light as images of a given model, nine in the exemplary embodiment, each image produced by light reflected from the model when illuminated by only one spherical harmonic component of incident light. The complete set of images that model can produce can be approximated by some linear combination of those nine images. Therefore, matching a model of the object to some input image becomes a matter of optimizing the coefficients of each harmonic component image so that the summation of the components creates a rendered image that most nearly approximates the input image.

The method of deriving the reflectance function described above is used in the object recognition process. To match an input image with an object model in the database, the object model must be positioned to match the position of the input image. There are standard methods of performing this function known in the art, though a preferred method is disclosed in U.S. patent application Ser. No. 09/538,209, filed 30 Mar. 2000, entitled "Method for Matching a Two Dimensional Image to One of a Plurality of Three Dimensional Candidate Models in a Database", now U.S. Pat. No. 6,956,569, the disclosure of which is hereby incorporated by reference.

Once positioned, images of the model are rendered under each of one or more spherical harmonic components of light as described above. These component rendered images can be linearly combined to arrive at an optimal rendered image of the model. An optimal rendered image means a rendered image that most closely approximates the input image. The comparison of the various rendered images to the input image is made by calculating the Euclidian Distance between the images, in a manner that is known in the art. The optimization is performed by a least squares fit technique between the vector that is the reflectance function and the matrix that represents the input image, also known in the art.

Other steps follow the optimization in the recognition process. One is computing some measure of similarity between the input image and the optimal rendered image for each model. This is accomplished be measuring the Euclidian Distance between each optimal image and the input image. The object model whose optimal rendered image is nearest the input image, assuming some threshold value of similarity must be reached, is a match to the input image.

While the reflectance function of the present invention is described in application to the field of machine vision, it is not limited to that field. There are numerous parallels between this work and advances in the field of computer graphics, and our invention has applicability there as well. The field of computer graphics is continually striving to produce more realistic rendered images based on object models that exist only in the computer. The reflectance function of the present invention advances that work as well.

Our invention has been described herein with reference to a particular exemplary embodiment. Certain alterations and modifications may be apparent to those skilled in the art, without departing from the scope of the invention. The exemplary embodiment is not meant to be limiting on the scope of the invention, which is defined by the appended claims.

What is claimed is:

1. A method of recognizing objects under various lighting conditions comprising:
   (a) providing a database comprising a plurality of three dimensional models,
   (b) providing an input image, (c) orienting each three dimensional model relative to the input image, (d) determining, for each three dimensional model, a rendered image which is most similar to the input image, said determining step comprising:
  (i) deriving a reflectance function that describes an approximation of the set of all possible rendered images that each three dimensional model can produce under all possible lighting conditions, said rendered images including both diffusely and specularly reflected light; and
  (ii) optimizing the reflectance function to determine rendered image of each model that is most similar to the input image;

(e) computing a measure of similarity between the input image and each optimal rendered image; and (f) selecting the three dimensional model corresponding to the optimal rendered image whose measure of similarity is most similar to the input image, wherein the reflectance function employs a broadened-specular reflectance model that accounts for the angle between the direction of observation and the direction of perfect specular reflectance, said broadened-specular reflectance model axially symmetric about the axis of perfect specular reflection.

2. The method according to claim 1 wherein the reflectance function includes a mathematical term to account for the absence of reflected light due to the position of the object model.

3. A method of image recognition of an input image, the method comprising:
  (a) receiving a three-dimensional model of a candidate object in a particular orientation;
  (b) generating a set of harmonic images for the three-dimensional model, the harmonic images forming the basis for a linear subspace, and approximating the specular and scattering reflectance on the candidate object when illuminated by a harmonic light; and
  (c) selecting a candidate image from the set of harmonic images, the candidate image representing a point in the linear subspace that is nearest to the input image, by seeking a vector of harmonic coefficients that minimizes the difference between the input image and the candidate image.

4. The method according to claim 3, wherein the candidate image is restricted to a subset of harmonic images that corresponds to physically realizable lighting conditions.

5. The method according to claim 3, wherein the linear subspace comprises the first four harmonic images.

6. The method according to claim 3, wherein the linear subspace comprises the first nine harmonic images.

7. The method according to claim 3, wherein the linear subspace comprises the first eighteen harmonic images.

8. The method according to claim 3, wherein approximating the specular and scattering reflectance on the candidate object comprises a term dependent upon the cosine of the angle between the reflected light and the direction of perfect specular reflection.

9. The method according to claim 3, wherein approximating the specular and scattering reflectance on the candidate object comprises a term derived from the Phong model of reflectance.

* * * * *